(12) United States Patent
Shinoda

(10) Patent No.: US 8,801,046 B2
(45) Date of Patent: Aug. 12, 2014

(54) CONNECTOR FOR FLUID PIPING AND CONNECTOR ASSEMBLY

(75) Inventor: Koji Shinoda, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 400 days.

(21) Appl. No.: 13/111,528

(22) Filed: May 19, 2011

(65) Prior Publication Data

US 2011/0304133 A1    Dec. 15, 2011

(30) Foreign Application Priority Data

Jun. 11, 2010   (JP) .................................. 2010-133976

(51) Int. Cl.
*F16L 39/00*   (2006.01)
*F16L 25/01*   (2006.01)

(52) U.S. Cl.
USPC .................. 285/124.4; 285/124.1; 285/124.3; 439/191

(58) Field of Classification Search
USPC .......... 285/124.1, 124.2, 124.3, 124.4, 124.5; 174/19, 24, 72 R, 88 R; 439/190, 191, 439/194, 195
See application file for complete search history.

(56) References Cited

U.S. PATENT DOCUMENTS

| | | | | |
|---|---|---|---|---|
| 3,133,777 A | * | 5/1964 | Anhalt | 439/350 |
| 3,469,863 A | * | 9/1969 | Riester et al. | 285/124.4 |
| 4,804,208 A | * | 2/1989 | Dye | 285/26 |
| 4,840,574 A | * | 6/1989 | Mills | 439/191 |
| 5,219,185 A | * | 6/1993 | Oddenino | 285/26 |
| 5,478,119 A | * | 12/1995 | Dye | 285/26 |
| 5,725,485 A | * | 3/1998 | Ribando et al. | 601/152 |
| 5,775,953 A | | 7/1998 | Yamanashi et al. | |
| 2005/0046184 A1 | | 3/2005 | Chang et al. | |
| 2005/0170704 A1 | | 8/2005 | Ishikawa et al. | |
| 2012/0109030 A1 | * | 5/2012 | Mros et al. | 601/152 |

FOREIGN PATENT DOCUMENTS

| | | |
|---|---|---|
| DE | 61 399 | 4/1968 |
| FR | 1 432 838 | 3/1966 |
| FR | 2 769 136 | 4/1999 |
| JP | 2010-62035 | 3/2010 |
| WO | 2010027009 | 3/2010 |

* cited by examiner

*Primary Examiner* — James Hewitt
(74) *Attorney, Agent, or Firm* — Gerald E. Hespos; Michael J. Porco; Matthew T. Hespos

(57) ABSTRACT

A connector for gas piping for detachably connecting gas tubes (T) corresponding to mating pipes (54) provided in a mating connector (50) is provided with a housing main body (10) connectable to the mating connector (50), a sub-connector (30) provided in the housing main body (10), joint pipes (32) connectable to the mating pipes (54) and having the gas tubes (T) connected thereto, and an engaging mechanism for holding the sub-connector (30) and the housing main body (10) in an engaged state.

12 Claims, 9 Drawing Sheets

CONNECTOR FOR FLUID PIPING AND CONNECTOR ASSEMBLY

BACKGROUND OF THE INVENTION

1. Field of the Invention

The invention relates to a connector for fluid piping, particularly gas piping and to a corresponding connector assembly.

2. Description of the Related Art

Japanese Unexamined Patent Publication No. 2010-62035 discloses a connector for gas piping that introduces exhaust gas from an exhaust pipe to a gas measuring device to measure components of exhaust gas of an automotive vehicle. A gas tube extends from the exhaust pipe and is connected to this connector. The gas tube and a mating pipe in a measuring device can be connected by connecting this connector to a mating connector in the gas measuring device.

The above-described connector for gas piping includes a metallic joint pipe formed in a housing main body by insert molding, and the gas tube is connected to an end of this joint pipe. An internally threaded part is formed at the end of the joint pipe. A metallic joint member is connected to an end of the gas tube. The gas tube is connected to the joint pipe by threadedly engaging the joint member with the internally threaded part.

The joint pipes and the joint members must be threadedly coupled at plural positions if there are plural gas tubes and plural joint pipes. Hence, there is a problem of poor efficiency. Further, plural joint pipes may be arranged side by side or in plural of levels. Thus, the joint member is mounted to the joint pipe in a narrow space due to wires and other influences, thereby further deteriorating assembling efficiency of the gas tubes.

The invention was developed in view of the above situation and an object of the invention is to provide a connector for fluid piping that enables a fluid tube to be mounted to a housing main body by an easy and simple operation.

SUMMARY OF THE INVENTION

The invention relates to a connector for fluid piping for detachably connecting at least one fluid tube corresponding to at least one mating pipe provided in a mating connector. The connector includes a housing main body connectable to the mating connector. At least one sub-connector is provided detachably in the housing main body. At least one joint pipe is in the sub-connector. The joint pipe has a first end connected to the mating pipe when the housing main body is connected to the mating connector and a second end connectable to the fluid tube. An engaging mechanism holds the sub-connector engaged with the housing main body.

The housing main body and the joint pipe are separate members. Thus, the fluid tube can be connected initially to the sub-connector. The sub-connector then can be fit easily into the housing main body to mount the fluid/gas tube into the housing main body. Hence, the invention avoids the problems that occur when a prior art a fluid/gas tube is attempted to be assembled in a narrow space to a joint pipe that is formed integrally with a housing main body.

The joint pipe may be inserted at least partly into the interior of the mating pipe to be connected.

At least one O-ring may be fit on an outer peripheral part of the end of the joint pipe that is to be held in contact with the inner peripheral surface of the mating pipe. Accordingly, a clearance between the joint pipe and the mating pipe is sealed in a fluid-tight manner.

The joint pipe and the sub-connector may be made integrally or unitarily of synthetic resin. Accordingly, the number of parts can be reduced by integrally forming the joint pipe and the sub-connector using a molding die or the like, which is preferable in terms of management and cost.

The housing main body may include an electrical connector housing that is connectable to mating electrical connector housing of the mating connector. Accordingly, a hybrid connector for gas piping is provided including a joint pipe for gas and an electrical connector housing.

A plurality of mating pipes may be provided in the mating connector; and a plurality of joint pipes each having the fluid or gas tube connected thereto may be provided in the sub-connector. Accordingly, the plurality of joint pipes having the fluid or gas tubes connected thereto can be mounted collectively into the housing main body, thereby drastically improving operational efficiency. Further, even if the joint pipes are arranged side by side or in plural levels, it is not necessary to perform a fluid or gas tube assembling operation in a narrow space, such as an operation of mounting fluid or gas tubes to joint pipes integrally formed to the connector housing main body, as with a conventional connector. Rather, the fluid or gas tubes can be connected simply and easily.

The housing main body may include at least one sub-connector accommodating portion capable of accommodating the at least one sub-connector.

The sub-connector may include a coupling plate that holds portions of a plurality of joint pipes and fixes the plurality of joint pipes in an arrangement. Flexible engaging pieces may be provided on the coupling plate for engaging one or more engaging projections on the housing main body, and preferably on inner surfaces of the sub-connector accommodating portion.

The flexible engaging pieces may deform resiliently toward the center of the coupling plate by moving onto the respective engaging projections while inserting the sub-connector into the sub-connector accommodating portion. The flexible engaging pieces then restore resiliently to engage the respective engaging projections at a connection ending position. Accordingly, the sub-connector can be mounted into the sub-connector accommodating portion through a one-touch operation merely by inserting the sub-connector into the sub-connector accommodating portion of the housing main body.

The flexible engaging pieces may include two inclined pieces cantilevered back and out from front ends of the end surfaces of the coupling plate at the sides of the joint pipes and engaging pieces may extend farther back from the rear ends of the inclined pieces. The inclined pieces may be formed at positions that contact the engaging projections when the sub-connector is inserted into the sub-connector accommodating portion. More particularly, the engaging pieces may be formed with engaging holes and parts thereof adjacent to the engaging holes may define pressing/disengaging portions. The inclined pieces contact the engaging projections when the sub-connector is inserted into the sub-connector accommodating portion. Thus, the flexible engaging pieces reliably deform resiliently toward the center of the coupling plate. Further, the sub-connector can be separated easily from the housing main body for maintenance or another reason by pressing the pressing/disengaging portions from the opposite sides of the coupling plate toward the center of the coupling plate to resiliently deform the flexible engaging pieces.

The invention also relates to a connector assembly for fluid piping comprising the above-described connector and a mating connector connectable with a housing main body of the connector. The mating connector includes a mating electrical connector housing and the housing main body includes an electrical connector housing connectable to the mating electrical connector housing.

These and other objects, features and advantages of the invention will become more apparent upon reading of the following detailed description of preferred embodiments and accompanying drawings.

DETAILED DESCRIPTION OF THE PREFERRED EMBODIMENTS

Figure 1:
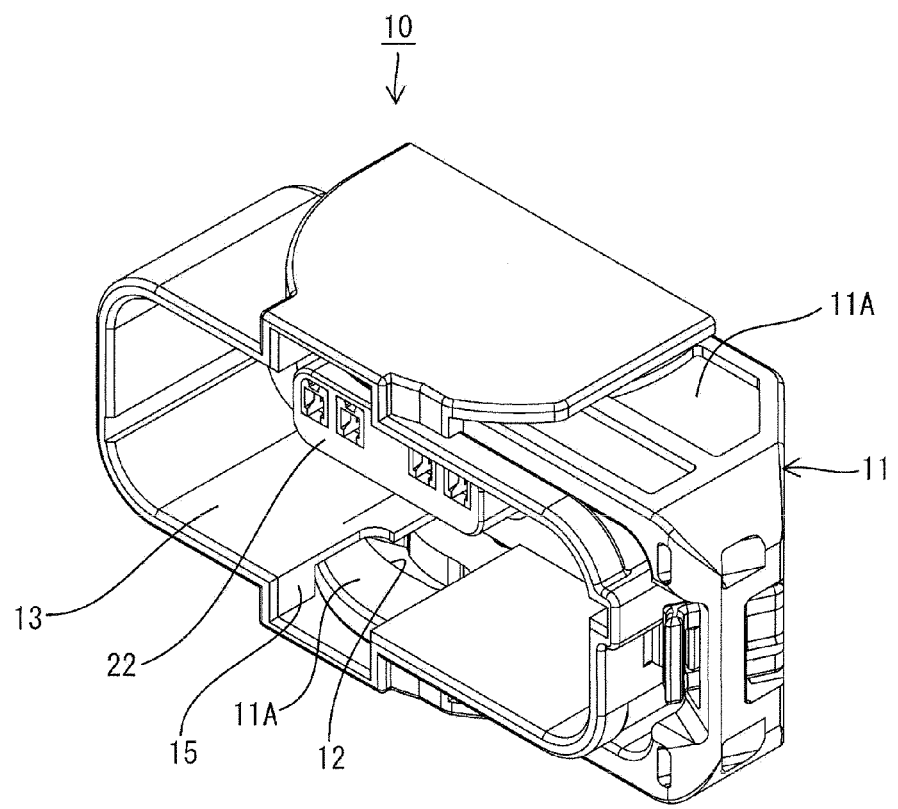
FIG. 1 is a front perspective view of a connector housing main body according to one embodiment of the invention.
Figure 2:
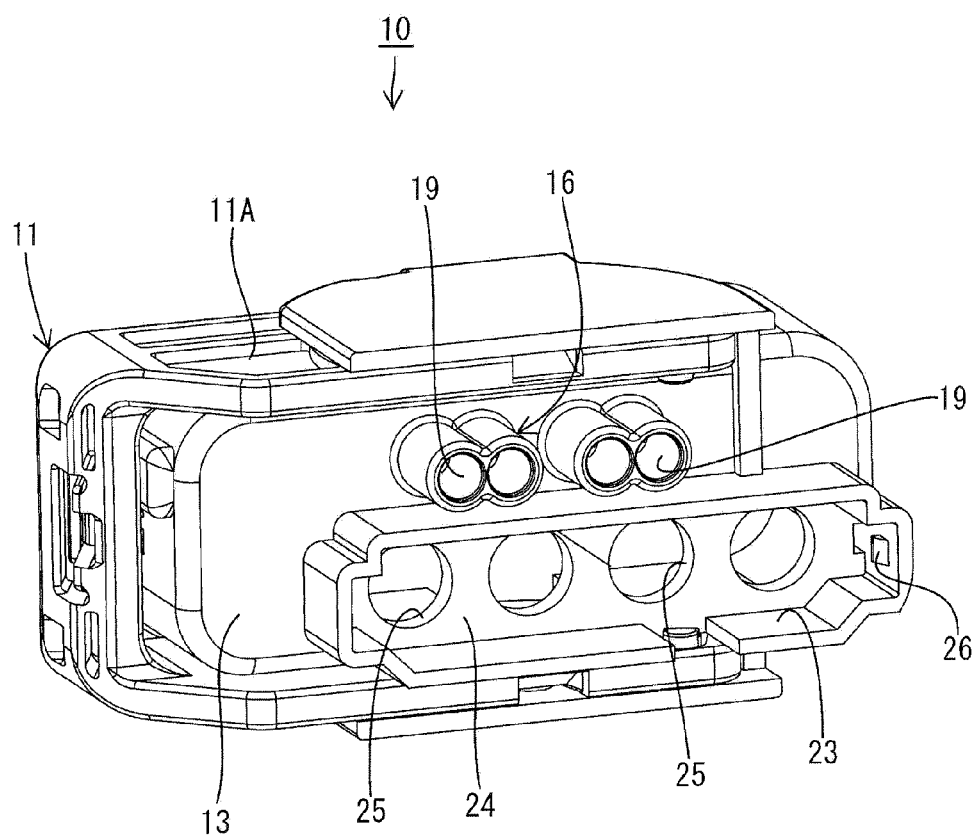
FIG. 2 is a rear perspective view of the housing main body.
Figure 3:
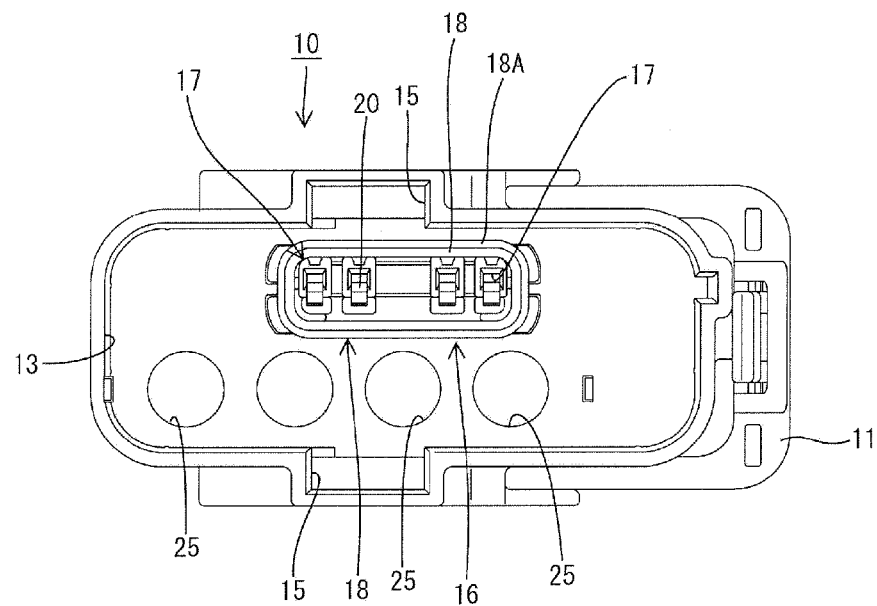
FIG. 3 is a front view of the housing main body.
Figure 6:
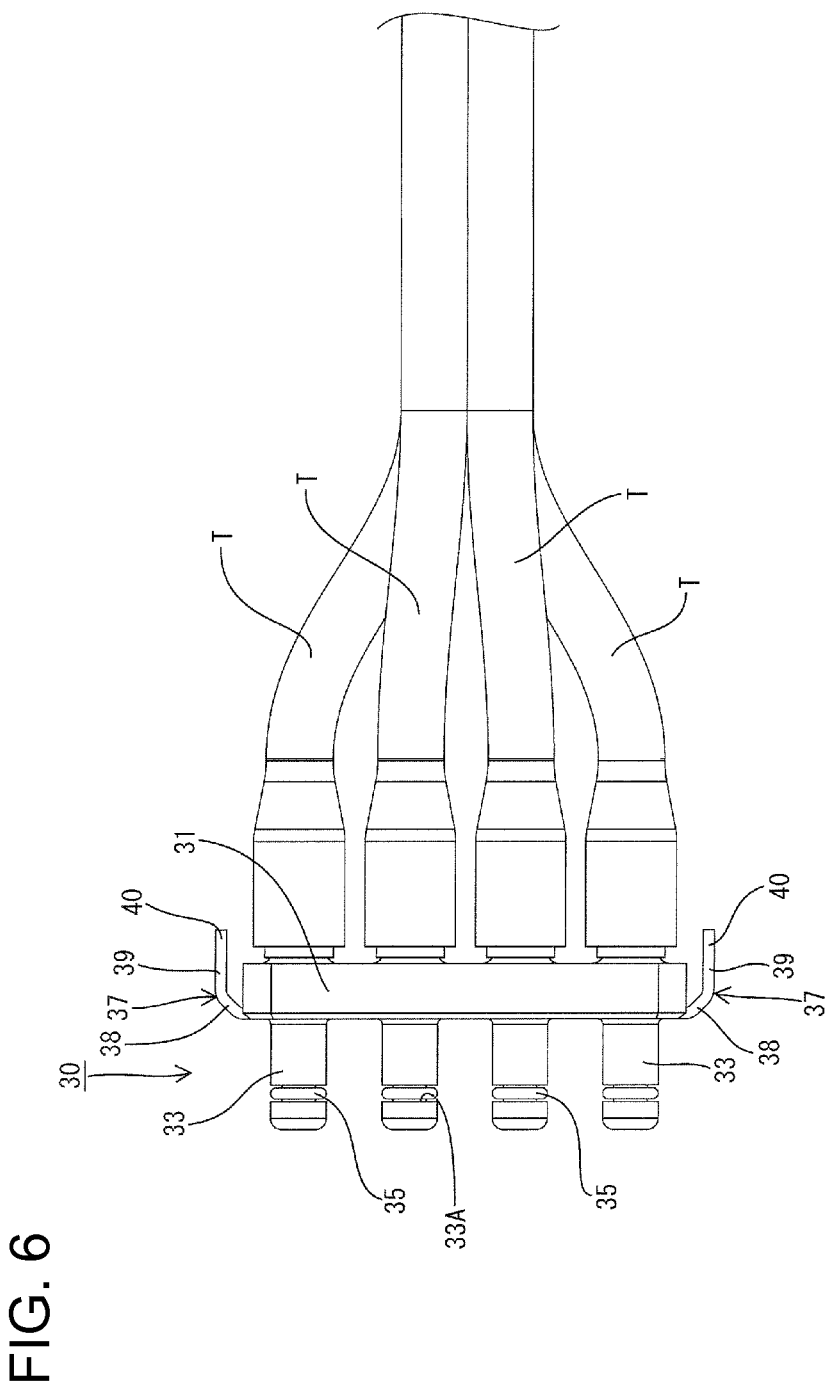
FIG. 6 is a bottom view showing gas tubes connected to the sub-connector.
Figure 9:
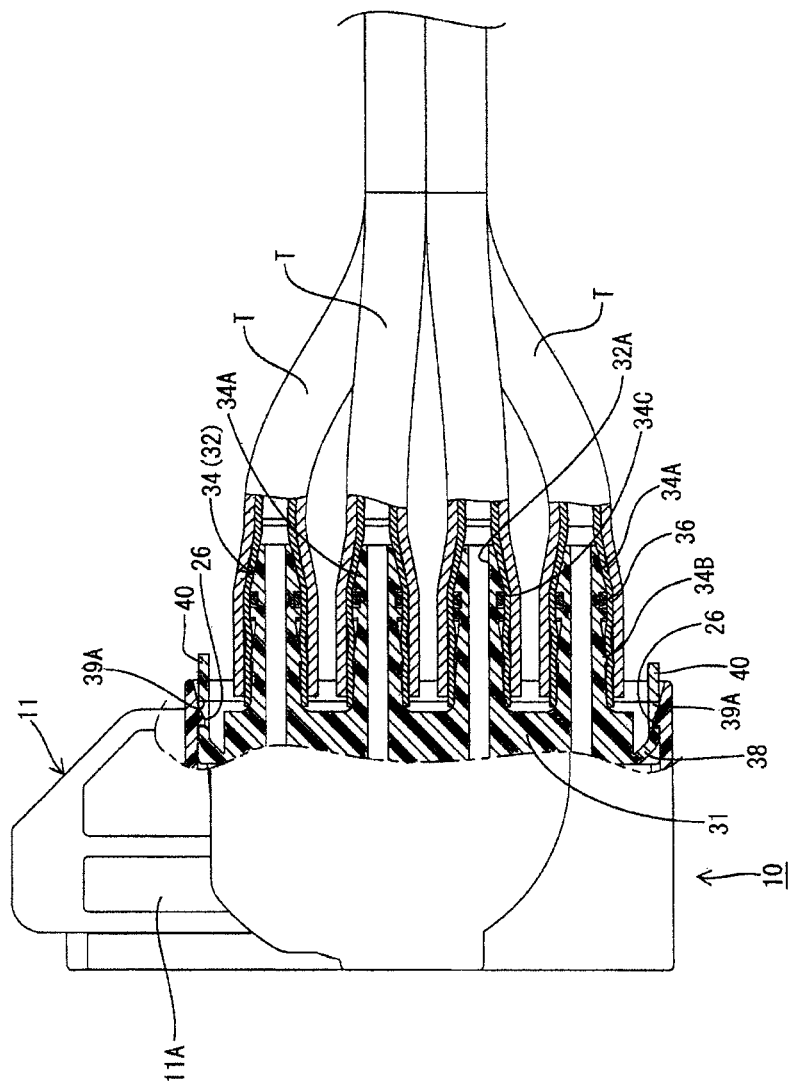
FIG. 9 is a bottom view partly in section showing the sub-connector mounted in the housing main body.

A connector for gas piping according to the invention includes a housing main body 10 in the form of a receptacle with four rounded corners as shown in FIGS. 1 and 2, and a sub-connector 30 having gas or fluid tubes connected thereto as shown in FIG. 6. The connector is formed by fitting the sub-connector 30 into the housing main body 10, as shown in FIG. 9. In the following description, forward and backward directions are based on a lateral direction in FIG. 9 and a side of a connection surface (left side in FIG. 9) of the connector for gas piping is referred to as the front.

The housing main body 10 is made e.g. of synthetic resin, and a connecting lever 11 extends along the outer peripheral surface of the housing main body 10. The connecting lever 11 is substantially U-shaped in front view and is supported rotatably on outer surfaces of the housing main body 10, as shown in FIGS. 1 to 4. The lever 11 has two arms 11A and a cam groove 12 is formed in surfaces of the arms 11A that face each other, as shown in FIG. 1. The cam grooves 12 are engageable with cam pins 52 provided on a mating housing 51 of a mating connector 50. The cam pins 52 are pulled toward back of the cam grooves 12 by a cam action generated by operating the lever 11 for connecting the mating connector 50 and the housing main body 10 (see FIG. 10). In this way, the respective housings 10, 51 are pulled toward each other and connected.

The housing main body 10 has a forwardly open receptacle 13. Escaping grooves 15 are formed at substantially widthwise central parts of inner surfaces of the receptacle 13 and extend from the opening of the receptacle 13 to the back wall of the receptacle 13. The escaping grooves 15 are formed substantially along entrance paths for the respective cam pins 52 of the mating housing 51 and guide the corresponding cam pins 52 to the cam grooves 12 of the lever 11 when the mating housing 51 is being inserted into the receptacle 13 and connected.

Figure 10:
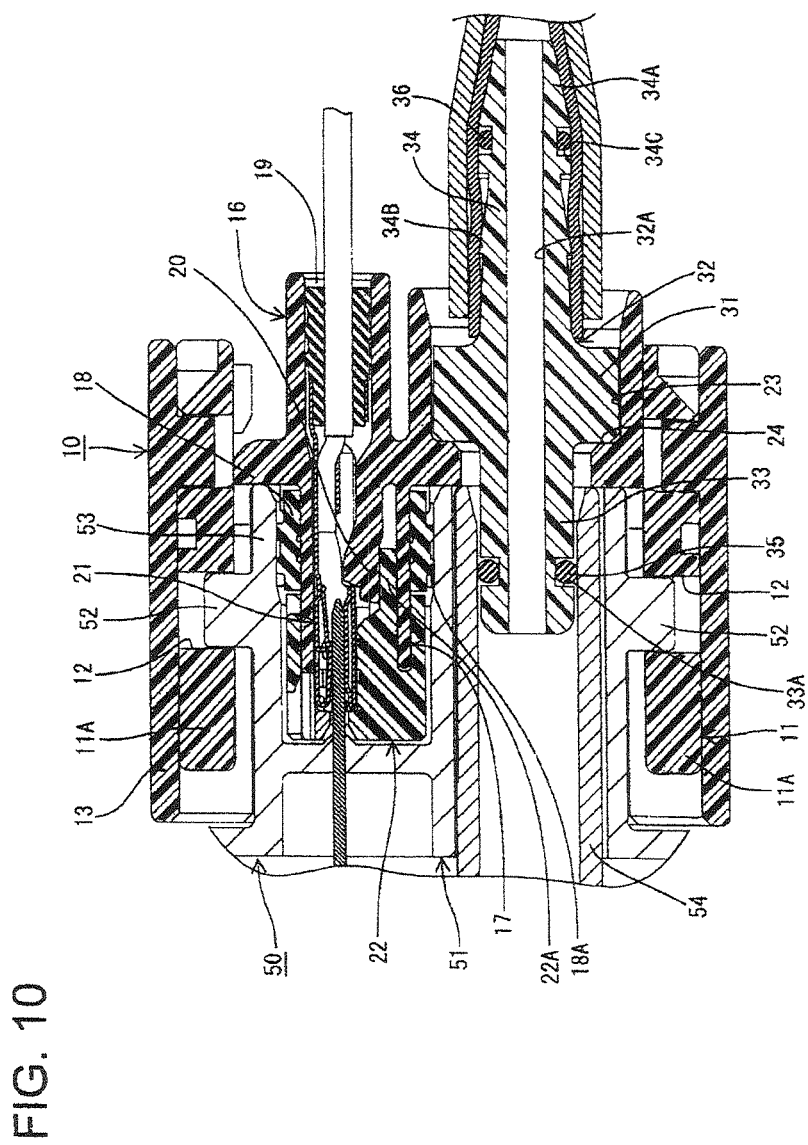
FIG. 10 is a section showing a state after connection of a connector for gas piping and a mating connector.

An electrical connector housing 16 extends in forward and backward directions through the back wall of the receptacle 13, as shown in FIG. 10. The electrical connector housing 16 includes a fitting tube 17 extending forward from the back wall of the receptacle 13. A ring-shaped seal 18 is mounted on the outer peripheral surface of a base end of the fitting tube 17 and includes lips 18A. The seal 18 seals between the electrical connector housings 16, 53 in a fluid- or liquid-tight manner when the fitting tube 17 is fit into a receptacle in the mating electrical connector housing 53 of the mating connector 50.

Two spaced apart pairs of cavities 19 are arranged substantially side by side in the electrical connector housing 16, with the cavities in each pair being substantially adjacent to each other. A flexible locking lance 20 is cantilevered in a substantially forward and inward direction from an inner surface of each cavity 19, as shown in FIG. 10. Each flexible locking lance 20 locks a female terminal fitting 21 that has been inserted into the cavity 19 from behind and retains the female terminal fitting 21 in the cavity 19.

A substantially rectangular restricting tube 22 is mounted on a leading end portion of the fitting tube 17 after the female terminal fittings 21 are locked by the flexible locking lances 20. This restricting tube 22 includes deformation restricting portions 22A substantially in the form of tongues that closely contact outer surfaces of the flexible locking lances 20 to prevent resilient deformation of the flexible locking lances 20 when the restricting tube 22 is mounted on the fitting tube 17.

The sub-connector 30 includes a long narrow coupling plate 31 and joint pipes 32 penetrate through the coupling plate 31, as shown in FIGS. 5 to 8.

Figure 5:
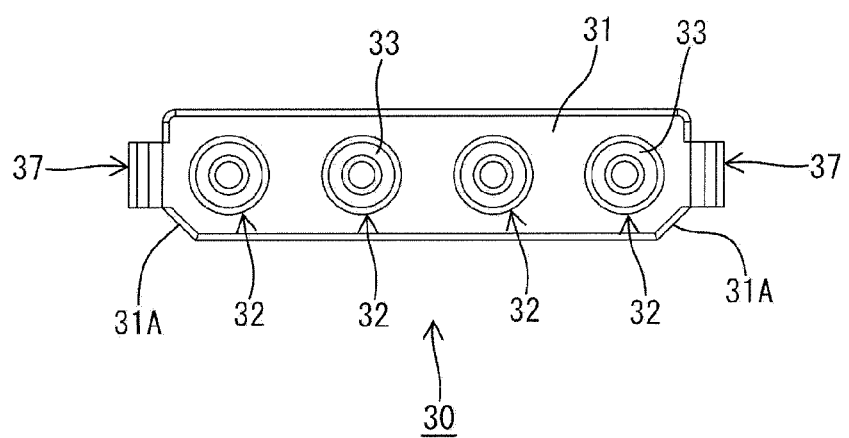
FIG. 5 is a front view of a sub-connector according to the embodiment.

Inclined portions 31A are formed at lower parts of the opposite left and right sides the coupling plate 31 and incline so that the width of the upper end surface is somewhat longer than the width of the lower end surface, as shown in FIG. 5.

Figure 7:
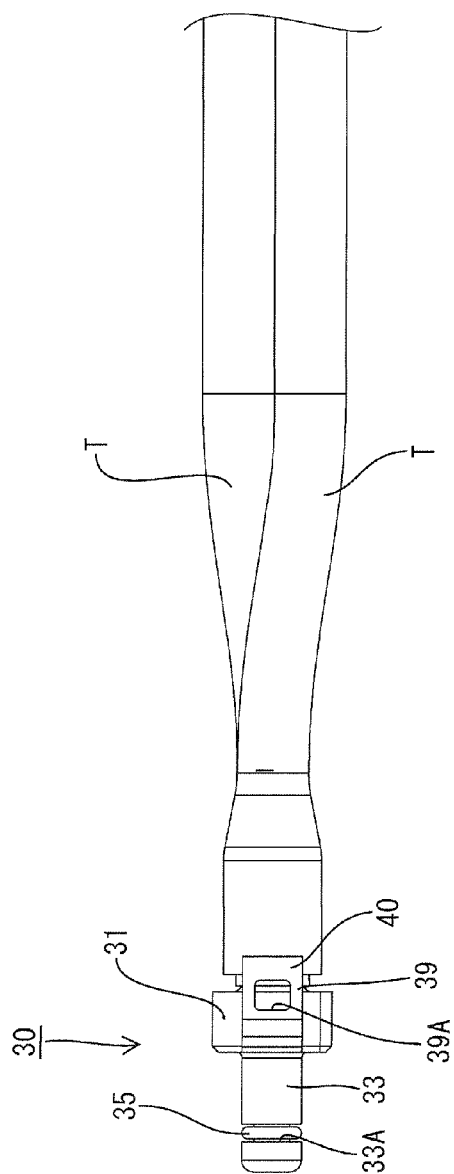
FIG. 7 is a side view showing the state of FIG. 6.
Figure 8:
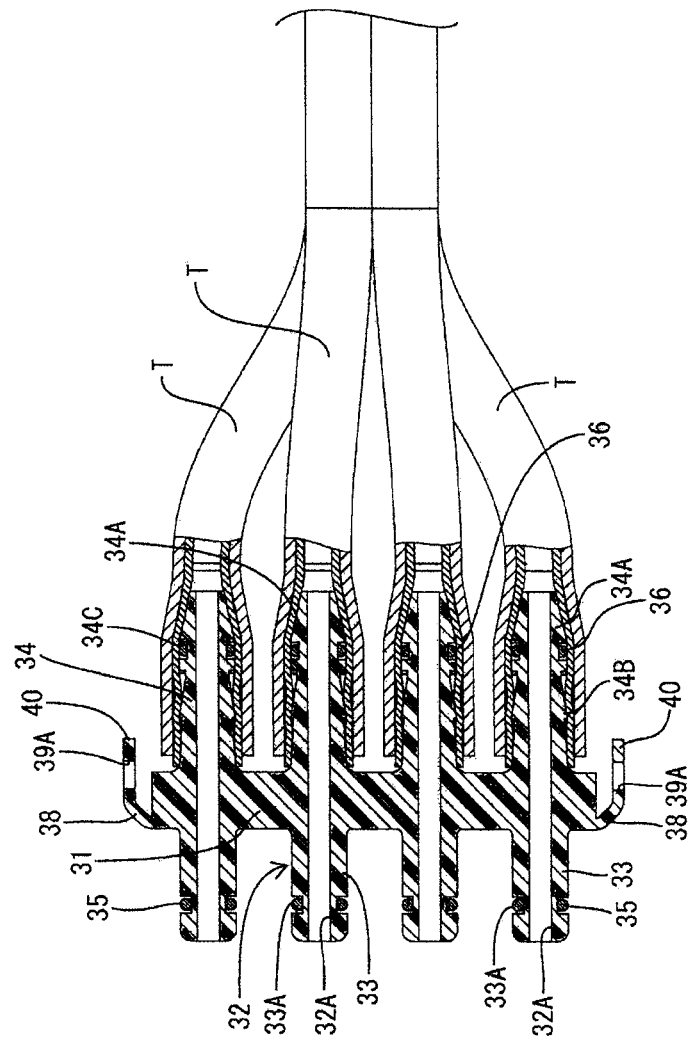
FIG. 8 is a bottom view partly in section showing the gas tubes connected to the sub-connector.

Four substantially cylindrical joint pipes 32 are formed unitarily to the coupling plate 31 and penetrate through plate surfaces of the coupling plate 31, as shown in FIGS. 6 to 8. A pipe connecting portion 33 is defined at a first end of each joint pipe 32 before the coupling plate 31 and can be connected to a mating pipe 54 in the mating connector 50. A tube connecting portion 34 is defined at the second end of each joint pipe and can be connected to a fluid or gas tube T. A continuous fluid or gas flow path 32A is provided in each joint pipe 32 and extends from the opening of the pipe connecting portion 33 to the opening of the tube connecting portion 34.

As shown in FIG. 10, the pipe connecting portions 33 project forward from the back wall of the receptacle 13 when the sub-connector 30 is mounted into the housing main body 10. The pipe connecting portions 33 are inserted and fitted into the mating pipes 54 in the mating connector housing 51 when the housing main body 10 is connected to the mating connector housing 51.

A first annular groove 33A is formed in the outer peripheral surface of a leading end of the pipe connecting portion 33 and has a first O-ring 35 mounted therein. The first O-ring 35 seals a clearance between the inner peripheral surface of the mating pipe 54 and the outer peripheral surface of the pipe connecting portion 33 in a fluid- or liquid-tight manner to prevent entrance of water and the like into the interiors of the pipes when the pipe connecting portion 33 is connected to the mating pipe 54.

A tapered portion 34A is formed at a leading end of each tube connecting portion 34 so that the tube connecting portion 34 can be inserted easily inserted into the fluid or gas tube T.

At least one annular engaging projection 34B is formed on the outer peripheral surface of each tube connecting portion 34 and widens from the rear toward the front over substantially the entire circumference. This annular engaging projection 34B engages the inner surface of the fluid or gas tube T to retain the tube connecting portion 34 in the gas tube T when the tube connecting portion 34 is inserted into the interior of the gas tube T.

A second annular groove 33C is formed in the outer peripheral surface of the tube connecting portion 34 behind the tapered portion 34A and a second O-ring 36 is mounted therein. The second O-ring 36 seals a clearance between the inner peripheral surface of the fluid or gas tube T and the outer peripheral surface of the tube connecting portion 34 in a fluid- or liquid-tight manner to prevent entrance of water and the like into the interiors of the pipes when the tube connecting portion 34 is inserted into the gas tube T.

Figure 4:
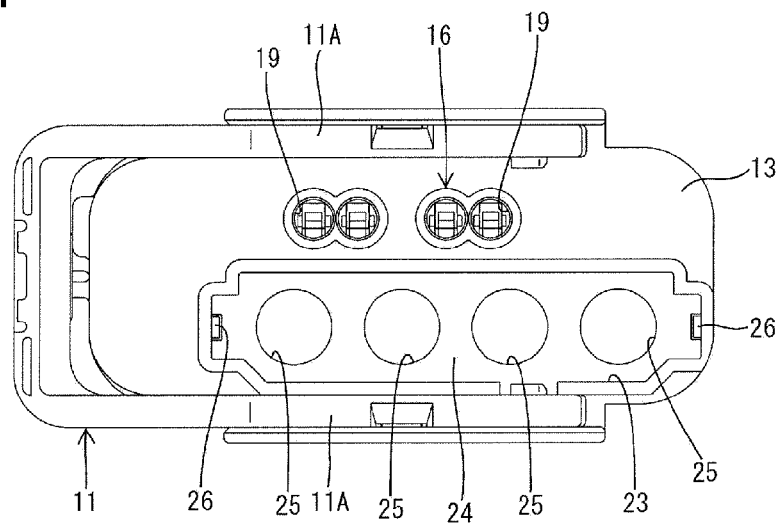
FIG. 4 is a rear view of the housing main body.

As shown in FIGS. 2, 4 and 10, a sub-connector accommodating portion 23 is provided in the rear end surface of the housing main body 10 for accommodating the sub-connector 30 therein. The inner peripheral shape of the sub-connector accommodating portion 23 is substantially the same as the outer peripheral shape of the sub-connector 30 when viewed from the front as shown in FIG. 2. Thus, when the sub-connector 30 is inserted into the sub-connector accommodating portion 23, the outer peripheral surface of the sub-connector 30 is held in close contact with the inner peripheral surface of the sub-connector accommodating portion 23. The inclined portions 31A at the lower parts of the left and right sides of the sub-connector 30 function to position the sub-connector 30 when the sub-connector 30 is inserted into the sub-connector accommodating portion 23.

As shown in FIG. 2, four pipe insertion holes 25 are formed in a back wall 24 of the sub-connector accommodating portion 23 and communicate with the receptacle 13. The pipe insertion holes 25 are slightly larger than the outer shape of the pipe connecting portions 33 of the sub-connector 30. The respective pipe insertion holes 25 are set so that the pipe connecting portions 33 can be inserted into the corresponding pipe insertion holes 25, as shown in FIG. 10, when the sub-connector 30 is mounted into the sub-connector accommodating portion 23.

Flexible engaging pieces 37 are formed on opposite side surfaces of the coupling plate 31 of the sub-connector 30, as shown in FIGS. 6 to 9. Each flexible engaging piece 37 includes an inclined piece 38 cantilevered from the front end of the side surface of the coupling plate 31 in a backward and outward direction and an engaging piece 39 extending farther back from the rear end of the inclined piece 38.

As shown in FIG. 7, a substantially rectangular engaging hole 39A is formed substantially in the center of each engaging piece 39. The engaging holes 39A are engageable with engaging projections 26 in the sub-connector accommodating portion 23 to retain the sub-connector 30 in the sub-connector accommodating portion 23 when the sub-connector 30 is inserted into the sub-connector accommodating portion 23. Note that the engaging projections 26 are inclined inwardly from the rear to the front.

Pressing/disengaging portions 40 are defined at leading ends of the engaging pieces 39. The pressing/disengaging portions 40 can be pressed from the opposite widthwise sides toward the center of the coupling plate 31 at the time of separating the sub-connector 30 from the sub-connector accommodating portion 23. Thus the flexible engaging pieces 37 deform resiliently to enable the sub-connector 30 to be separated from the sub-connector accommodating portion 23.

The tube connecting portions 34 of the sub-connector 30 are pressed into the gas tubes T beforehand to prepare the sub-connector 30 (see FIGS. 6 to 8). The sub-connector 30 then is positioned in conformity with the shape of the opening of the sub-connector accommodating portion 23 of the housing main body 10 and is inserted into the sub-connector accommodating portion 23. In this connecting process, the inclined pieces 38 of the flexible engaging pieces 37 at the opposite widthwise sides of the sub-connector 30 contact the engaging projections 26 of the sub-connector accommodating portion 23 and deform resiliently toward the center of the coupling plate 31. The sub-connector 30 is inserted farther until the front end surface of the coupling plate 31 contacts the back wall 24 of the sub-connector accommodating portion 23. Then, the engaging projections 26 engage the respective engaging holes 39A of the flexible engaging pieces 37 to cancel a contact state of the flexible engaging pieces 37 and the engaging projections 26. In this way, the flexible engaging pieces 37 are restored resiliently to retain the sub-connector 30 in the sub-connector accommodating portion 23.

As described above, the gas tubes T can be mounted to the connector housing main body 10 very easily and simply merely by inserting the sub-connector 30 into the sub-connector accommodating portion 23 of the housing main body 10. Further, the sub-connector 30 can be detached very easily from the housing main body 10 for maintenance or other reason merely by pressing the pressing/disengaging portions 40 laterally from the opposite widthwise sides toward the center of the coupling plate 31 to deform the flexible engaging pieces 37 resiliently.

The invention is not limited to the above described and illustrated embodiment. For example, the following embodiments also are included in the scope of the invention.

Four pairs of the joint pipes 32 of the sub-connector 30 and the pipe insertion holes 25 of the housing main body 10 are mated in the above embodiment. However, the invention is not limited to such a mode and any number from one or more joint pipes 32 formed in the sub-connector 30 and a corresponding number of pipe insertion holes 25 formed in the connector housing 10 may be provided.

The flexible engaging pieces 37 are formed at the opposite widthwise sides of the sub-connector 30 in the above embodiment. However, the flexible engaging pieces 37 may be provided at other positions on the sub-connector 30.

The sub-connector 30 has the flexible engaging pieces 37 with the engaging holes 39A for locking to the engaging portions 26 of the sub-connector accommodating portion 23 to retain the sub-connector 30 in the sub-connector accommodating portion 23. However, other retaining arrangements may be provided. For example, one or more resilient engaging claws may be formed near the opening of the sub-connector accommodating portion 23 for locking to one or more engaging portions on the sub-connector 30 and retaining the sub-connector 30 in the sub-connector accommodating portion 23.

The first O-ring 35 is fit on the outer peripheral part of the pipe connecting portion 33 of each joint pipe 32 and is held in contact with the inner peripheral surface of the mating pipe 54 in the above embodiment. However other sealing arrangements are possible. For example, a seal can have one or more inner lips held in contact with the outer peripheral surface of the pipe connecting portion 33 and/or one or more outer lips held in contact with the inner peripheral surface of the mating pipe.

The joint pipes 32 are unitary with the coupling plate 31 of the sub-connector 30 in the above embodiment. However, the coupling plate 31 may be formed with one or more pipe engaging holes for holding one or more separately formed joint pipes 32.

The sub-connector 30 is separated from the housing main body 10 by pressing the pressing/disengaging portions 40 on the flexible engaging pieces 37 in the above embodiment.

However, the invention is not limited to such a mode. For example, the sub-connector 30 may be separated from the sub-connector accommodating portion 23 using a special jig. Alternatively, the sub-connector 30 may be inseparably mounted into the sub-connector accommodating portion 23.

What is claimed is:

1. A connector for detachably connecting a plurality of fluid tubes to a plurality of mating pipes in a mating connector, comprising:
   a housing main body having opposite front and rear ends, a receptacle open at the front end of the housing main body and being connectable to the mating connector, a sub-connector accommodating portion open at the rear end of the housing main body, a wall formed between the receptacle and the sub-connector accommodating portion and a plurality of pipe insertion holes formed through the wall;
   at least one sub-connector detachably provided in the sub-connector accommodating portion of the housing main body, the sub-connector having a coupling plate with opposite first and second surfaces, the coupling plate being disposed in the sub-connector accommodating portion, a plurality of joint pipes unitary with the coupling plate of the sub-connector, each of the joint pipes having a first end projecting from the first surface of the coupling plate and passing through the pipe insertion holes in the wall of the housing main body and into the receptacle to be connected to one of the mating pipes when the housing main body is connected to the mating connector, each of the joint pipes further having a second end projecting from the second surface of the coupling plate and configured to be connectable to one of the fluid tubes; and
   an engaging mechanism for holding the sub-connector engaged with the housing main body.

2. The connector for fluid piping of claim 1, wherein each of the joint pipes is configured for insertion into a corresponding one of the mating pipes.

3. The connector for fluid piping of claim 1, further comprising a plurality of O-rings fit respectively on outer peripheral parts of the first end of each of the joint pipes for contacting an inner peripheral surface of the respective mating pipe.

4. The connector for fluid piping of claim 1, wherein the plurality of joint pipes and the sub-connector are made of synthetic resin.

5. The connector for fluid piping of claim 1, wherein the engaging mechanism includes at least one flexible engaging piece provided on the coupling plate and at least one engaging projection on the housing main body, the flexible engaging piece and the engaging projection being configured and disposed for engaging each other when the sub-connector is provided in the housing main body.

6. The connector for fluid piping of claim 5, wherein the at least one flexible engaging piece comprises two flexible engaging pieces and the at least one engaging projection comprises two engaging projections formed in the sub-connector accommodating portion, the flexible engaging pieces being deformed resiliently toward a center of the coupling plate by moving onto the respective engaging projections when inserting the sub-connector into the sub-connector accommodating portion and being resiliently restored to engage with the respective engaging projections at a connection ending position.

7. The connector for fluid piping of claim 6, wherein each of the flexible engaging pieces includes an inclined piece extending from front end portions of the surfaces of the coupling plate at positions laterally of the joint pipes and cantilever back and out and engaging pieces extending back from the rear ends of the respective inclined pieces, the inclined pieces being at positions to contact the engaging projections when the sub-connector is inserted into the sub-connector accommodating portion, and the engaging pieces having engaging holes and pressing/disengaging portions substantially adjacent to the engaging holes.

8. A connector assembly, comprising:
   a mating connector with a plurality of mating fluid pipes; and
   a connector having a housing main body with opposite front and rear ends, a receptacle open at the front end of the housing main body and being connectable to the mating connector, a sub-connector accommodating portion open at the rear end of the housing main body, a wall formed between the receptacle and the sub-connector accommodating portion and a plurality of pipe insertion holes formed through the wall; and
   at least one sub-connector detachably provided in the sub-connector accommodating portion of the housing main body, the sub-connector having a coupling plate with opposite first and second surfaces, the coupling plate being disposed in the sub-connector accommodating portion, a plurality of joint pipes unitary with the coupling plate of the sub-connector, each of the joint pipes having a first end projecting from the first surface of the coupling plate, passing through one of the pipe insertion holes in the wall of the housing main body into the receptacle and connected to one of the mating fluid pipes when the housing main body is connected to the mating connector, each of the joint pipes further having a second end projecting from the second surface of the coupling plate and connectable to one of a plurality of fluid tubes, and an engaging mechanism for holding the sub-connector engaged with the housing main body.

9. The connector assembly of claim 8, wherein:
   the mating connector further includes a mating electrical connector housing; and
   the housing main body further includes an electrical connector housing connectable to the mating electrical connector housing.

10. The connector assembly of claim 9, wherein each of the joint pipes is configured for insertion into one of the mating fluid pipes.

11. The connector assembly of claim 10, further comprising a plurality of O-rings fit on an outer peripheral part of the first end of each of the plurality of joint pipes for contacting an inner peripheral surface of each of the plurality of mating fluid pipes.

12. A hybrid connector for fluid and electrical connection, comprising:
   a housing main body having opposite front and rear ends, a receptacle open at the front end of the housing main body, an electrical connector housing integral with the housing main body and having cavities extending therethrough from the receptacle to the rear end of the housing main body, a sub-connector accommodating portion open at the rear end of the housing main body and having a wall forward of the rear end of the housing main body, pipe insertion holes formed through the wall of the sub-connector accommodating portion and into the receptacle;
   terminal fittings mounted respectively in the cavities;
   a sub-connector having a coupling plate detachably mounted in the sub-connector accommodating portion, the coupling plate having opposite front and rear surfaces, a plurality of joint pipes unitary with the coupling plate, each of the joint pipes having a pipe connecting portion projecting from the front surface of the coupling plate, through the pipe insertion holes in the back wall of the sub-connector accommodating portion and into the receptacle, each of the joint pipes further having a tube connecting portion projecting rearward from the rear surface of the coupling plate for connection with a fluid tube; and an engaging mechanism for holding the sub-connector engaged with the housing main body.

* * * * *